United States Patent [19]

Kai

[11] Patent Number: 4,649,251
[45] Date of Patent: Mar. 10, 1987

[54] BLANK GUIDE DEVICE OF RESISTANCE WELDING MACHINE FOR SEAM WELDING OF CAN BODY

[75] Inventor: Takayuki Kai, Osaka, Japan

[73] Assignee: Daiwa Can Company, Limited, Tokyo, Japan

[21] Appl. No.: 704,002

[22] Filed: Feb. 21, 1985

[30] Foreign Application Priority Data

Feb. 27, 1984 [JP] Japan ................................ 59-35677

[51] Int. Cl.⁴ .......................................... B23K 11/06
[52] U.S. Cl. .................................. 219/64; 219/61.3
[58] Field of Search ................... 219/61.13, 61.3, 64, 219/82; 228/17.5

[56] References Cited

U.S. PATENT DOCUMENTS

| 4,160,892 | 7/1979 | Opprecht et al. ................. 219/83 |
| 4,214,140 | 7/1980 | Opprecht ........................ 219/61.3 |
| 4,341,943 | 7/1982 | Nilsen .......................... 219/64 X |

FOREIGN PATENT DOCUMENTS 961747 6/1964 United Kingdom .

Primary Examiner—E. A. Goldberg
Assistant Examiner—C. M. Sigda
Attorney, Agent, or Firm—Wenderoth, Lind & Ponack

[57] ABSTRACT

A blank guide device for a resistance welding machine guides cylindrically-rolled blanks employed to produce can bodies to the welding point. The blank guide device includes a pair of blocks respectively constituting opposed L-shaped surfaces in place of a conventional Z-shaped guide portion.

1 Claim, 12 Drawing Figures

FIG. 1A (PRIOR ART)
FIG. 1B (PRIOR ART)
FIG. 1C (PRIOR ART)
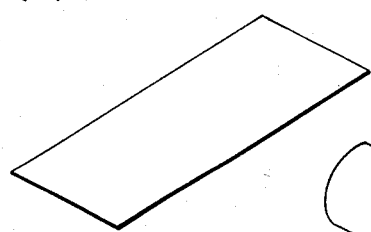
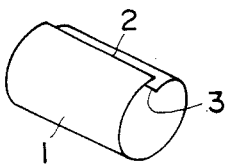
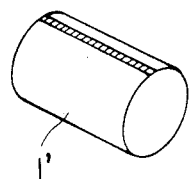
FIG. 2 (PRIOR ART)
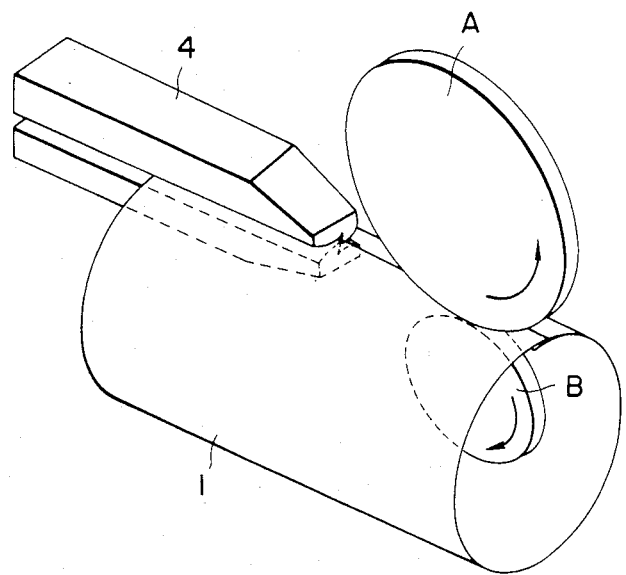

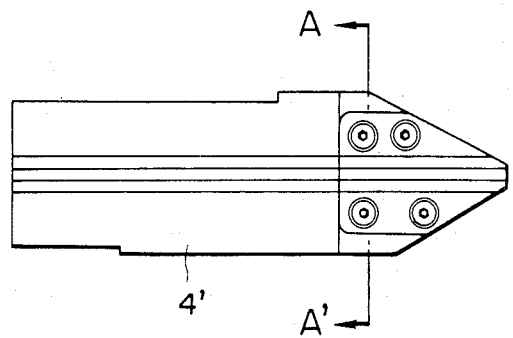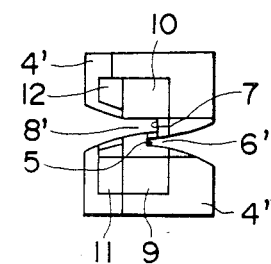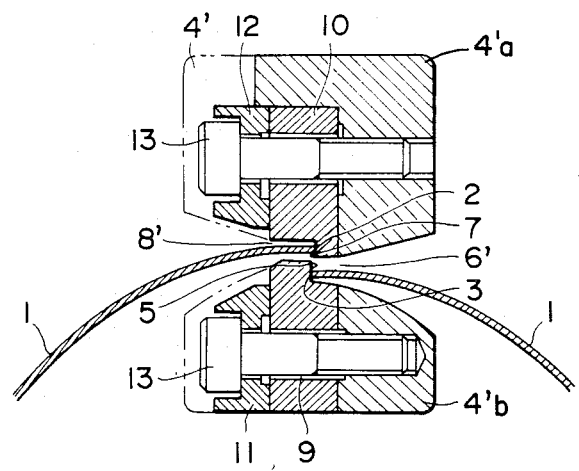

BLANK GUIDE DEVICE OF RESISTANCE WELDING MACHINE FOR SEAM WELDING OF CAN BODY

BACKGROUND OF THE INVENTION

1. Field of the Invention

The present invention relates to an improvement in a blank guide device for guiding cylindrical blanks employed to produce can bodies to the welding point between electrode rolls of a resistance welding machine.

2. Description of the Prior Art

To produce can bodies by seam welding, it is general practice to weld the overlapped edges of a cylindrical blank which is obtained by rolling a rectangular sheet material. In such a manufacturing process, a tool known as a Z-bar is generally employed to guide cylindrical blanks when they are fed to the welding point between the electrode rolls and to maintain the overlapping of the edges of the blanks at a constant width when they are welded.

The above-described manufacturing method will be explained hereinunder with reference to the accompanying drawings. Referring first to FIGS. 1A–1C which show the process of manufacturing can bodies, a rectangular sheet material shown in FIG. 1A is rolled into a cylindrical shape, such as that shown in FIG. 1B, and is then fed to the welding point between the electrode rolls while being guided by a Z-bar 4 in the manner shown in FIG. 2. In this case, both edges 2 and 3 of the cylindrical blank 1 are respectively pressed by upper and lower electrode rolls A and B so that the overlapping of the edges 2 and 3 is maintained at a constant width by means of the Z-bar 4 in the manner shown in FIG. 3 which is a cross-sectional view of the Z-bar 4, whereby the cylindrical blank 1 is seam-welded to form a cylindrical can body 1', such as that shown in FIG. 1C.

FIG. 4A is a side view of the Z-bar 4, FIG. 4B is a front view of the Z-bar 4, and FIG. 4C shows a worn portion 7' of a guide surface 7. As will be clear from these Figures, the bottom surface 5 of a groove 6 in the Z-bar 4 which guides the edge 3 of the cylindrical blank 1 and the bottom surface 7 of a groove 8 which guides the other edge 2 are continuously press-contacted by the edges 2 and 3 of the cylindrical blank 1 which slide thereon. For this reason, the bottom surfaces 5, 7 quickly become worn.

When the respective bottom surfaces 5 and 7 of the grooves 6 and 8 of the Z-bar 4 have become worn, the overlapping of the edges 2 and 3 of the cylindrical blank 1 varies and, therefore, if the wear exceeds an allowable amount, it is necessary to suspend the production. Not only when both the bottom surfaces 5 and 7 have become worn but also when only one of them has become worn, if the wear exceeds an allowable amount, the weld line varies, so that it is not possible to obtain an excellent welded seam. For this reason, even if the wear of the other bottom surface has not yet exceeded the allowable amount, such a Z-bar needs to be replaced with a new one.

As shown in FIG. 4C, the wear of the Z-bar 4 generally concentrates on the guide outlet side at its rearmost end, and the Z-bar 4 currently used in practice is constituted by an integral member, which is continuous as a whole. For this reason, with the conventional Z-bar 4, when the wear of a portion at its rearmost end exceeds the allowable amount, it is necessary to replace the whole of the Z-bar 4. The conventional Z-bar 4 has a complicated structure, which is difficult to machine; consequently, it is expensive—about 1,000 dollars per Z-bar. Moreover, the Z-bar 4 is mounted on a welding machine with a complex array of surrounding components. Therefore, replacing the Z-bar 4 requires many steps of disassemble and reassemble the surrounding parts, and it also takes much time to adjust a new Z-bar after it has been mounted. A typical Z-bar requires seven to eight hours to replace, an obviously undesirable characteristic.

SUMMARY OF THE INVENTION

It is an object of the present invention to improve the conventional arrangement so that, when the Z-bar has become worn, only the worn part thereof is replaced with a new one, whereas the whole of the Z-bar is replaced in the conventional arrangement.

It is another object of the present invention to facilitate the manufacture of replacement parts and to reduce the cost thereof.

It is still another object of the present invention to reduce the time required to replace a Z-bar, thereby improving the efficiency of the Z-bar.

To these ends, with this invention, there is provided a blank guide device of a resistance welding machine for guiding cylindrically-rolled blanks employed to produce can bodies to the welding point, comprising a pair of blocks constituting opposed L-shaped surfaces in place of the conventional Z-shaped guide portion.

The above and other objects, features and advantages of the present invention will become clear from the following description of the preferred embodiment thereof, taken in conjunction with the accompanying drawings.

BRIEF DESCRIPTION OF THE DRAWINGS

FIG. 1A shows a rectangular sheet material for a blank employed to produce a can body;

FIG. 1B shows a blank for a can body which has been rolled into a cylindrical shape;

FIG. 1C shows a blank for a can body which has been welded to form a cylindrical can body;

FIG. 2 is a perspective view of a cylindrical blank for a can body in the state wherein it is being welded while being guided by a conventional Z-bar;

FIG. 5A is a side view of a blank guide device according to the present invention;

FIG. 5B is a front view of the blank guide device shown in FIG. 5A;

FIG. 7 is a partially schematic sectional end view taken substantially along the line A—A' of FIG. 5A.

DESCRIPTION OF THE PREFERRED EMBODIMENT

Figure 6:
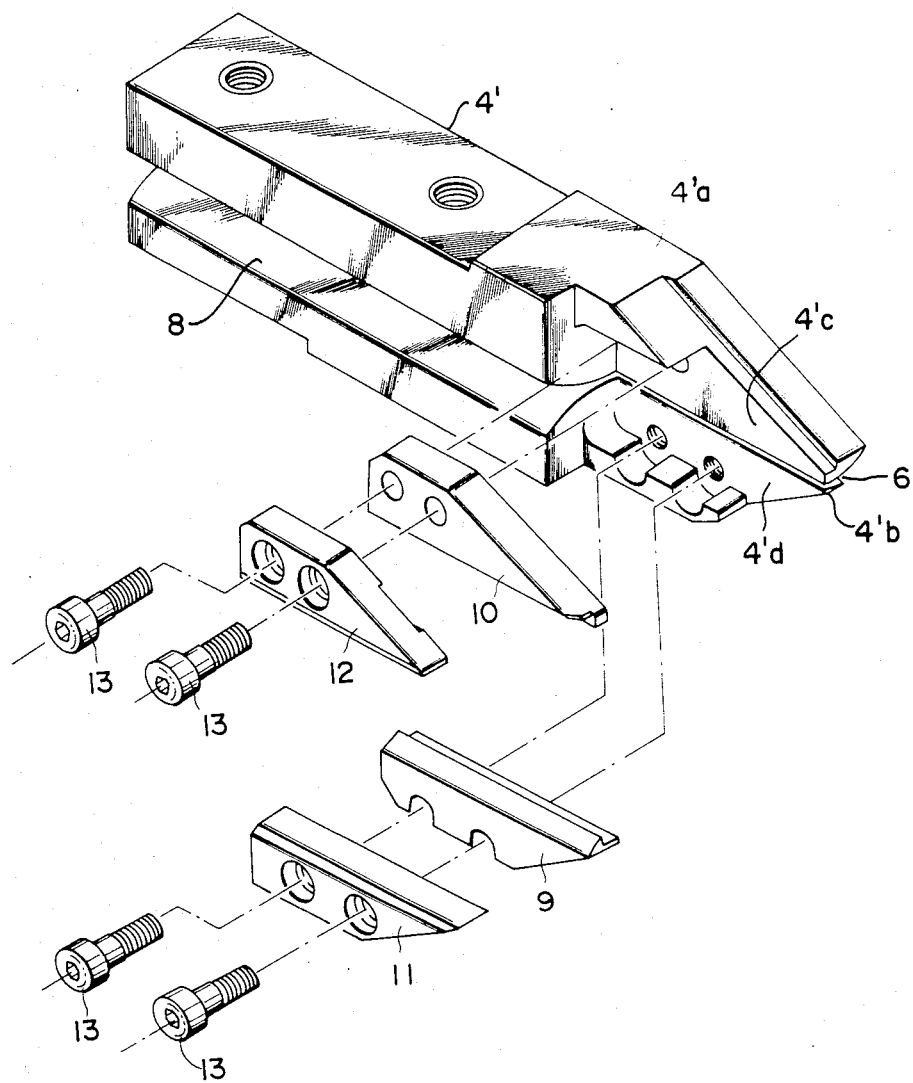
FIG. 6 is an exploded perspective view of the blank guide device according to the present invention.

The present invention will be described hereinunder in terms of one embodiment with reference to FIGS. 5 to 7.

In these figures: the reference numeral 1 denotes a cylindrical blank; 2 and 3 denote the edges of the cylindrical blank 1; 4' denotes a blank guide device body; 5 denotes the bottom surface of an L-shaped recess 6' of a block 9; 7 denotes the bottom surface of an L-shaped recess 8' of a block 10; 11 denotes a presser plate for the block 9; 12 denotes a presser plate for the block 10; and 13 denotes stud bolts respectively employed to bolt the blocks 9 and 10 to the blank guide device body 4' by the presser plates 11 and 12. At the forward end of body 4' are upper and lower projecting portions 4'a and 4'b having block receiving recesses 4'c and 4'd therein for receiving blocks 9 and 10.

Figure 3:
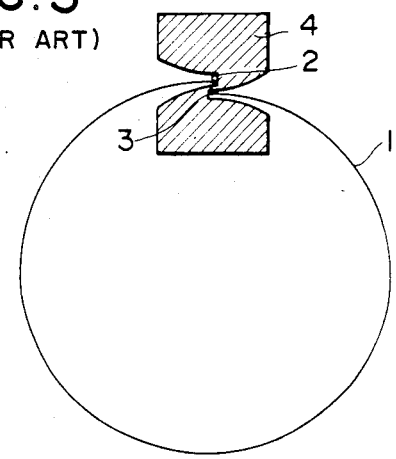
FIG. 3 is a cross-sectional view of a portion of the cylindrical blank and Z-bar shown in FIG. 2.
Figure 4A:
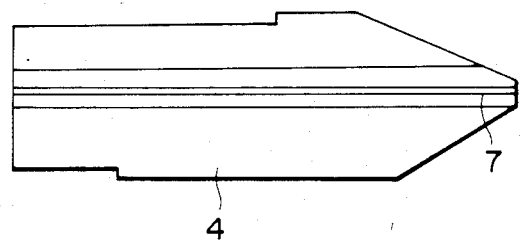
FIG. 4A is a side view of the conventional Z-bar.
Figure 4B:
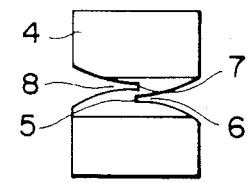
FIG. 4B is a front view of the conventional Z-bar.
Figure 4C:
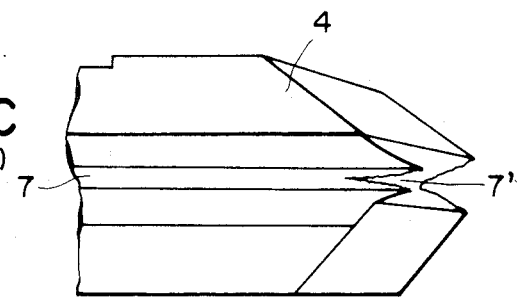
FIG. 4C is a perspective view showing a worn conventional Z-bar.

As will be clear from the comparison between FIGS. 4B and 5B, the blank guide device of the present invention does not include the Z-shaped guide portion which is constituted by the bottom surface 5 of the guide groove 6 and the bottom surface 7 of the guide groove 8 in the conventional Z-bar 4 shown in FIG. 4B. The blank guide device includes, in place of the forward end of the Z-shaped guide portion, a pair of blocks 9 and 10, having L-shaped recesses 6' and 8' which oppose each other and which are open on the sides which oppose each other, in place of the closed grooves 6 and 8. The arrangement of the bottom surfaces 5 and 7 of the blank guide device is the same as that of the conventional Z-bar 4. The recesses 6' and 8' run the full length of the blocks 9 and 10 and form continuations of the corresponding surfaces of grooves 6 and 8 in the body 4'.

Accordingly, when the edges 2 and 3 of the cylindrical blank 1 are guided, as shown in FIG. 7, they slide in contact with the bottom surfaces 5 and 7, respectively. Since the surface regions of the blank 1 inward from both its edges are guided by the respective surfaces of the blocks 9 and 10, when the cylindrical blank 1 is guided, the effect provided by the recesses 6' and 8', which have their respective open side portions open toward each other, is equal to that provided by the closed grooves 6 and 8. Further, since the arrangement of the bottom surfaces 5 and 7 of the blank guide device is the same as that of the conventional Z-bar 4, when the edges 2 and 3 of the cylindrical blank 1 are guided thereby and the effect provided by the blank guide device having the blocks 9 and 10 according to the present invention is equal to that provided by the conventional Z-bar 4.

In this embodiment, the only distal end portions of the blank guide device which quickly become worn are constituted by the pair of opposed blocks 9 and 10 which are respectively bolted to the bodies 4' by the stud bolts 13. Therefore, when the slide surface of either block 9 or 10 has become worn, it is only necessary to replace block 9 or 10, which has the worn slide surface, by loosening the associated stud bolt 13 and bolting a new block to the associated body 4'. Thus, replacement time is only 20 to 30 minutes, including the time required to adjust the new block. This is a great improvement over the conventional device, which requires seven to eight hours.

The present invention offers these advantages:

(1) The conventional Z-bar is a complicated structure; therefore, it takes a relatively long time to produce. The blocks 9 and 10 in the present invention are simple and small. They are therefore extremely easy to manufacture.

(2) The conventional Z-bar 4 is extremely costly, about 1,000 dollars. Blocks 9 and 10 of the present invention cost only about 160 dollars each.

(3) With the conventional Z-bar 4, when the distal end of a Z-bar is too worn to be used the entire Z-bar 4 must be replaced. However, the blank guide device bodies of the present invention will last until the blocks 9 and 10, which constitute the distal end portions of the device, have been replaced three times. Thus, the blank guide device of the present invention is very economical.

(4) Since the conventional Z-bar 4 is expensive, it is sometimes used even after it has become very worn, with consequent adverse effect on the quality of the product. The blocks 9 and 10 of the present invention, however, are relatively inexpensive and can be quickly replaced. It is, therefore, feasible to replace bars of the present invention before they are critically worn; hence, the quality of the product is improved and stabilized.

(5) The time required to replace the conventional Z-bar 4 is seven to eight hours. This greatly reduces the efficiency of the Z-bar. With the present invention, however, it takes only 20 to 30 minutes to replace each of the blocks 9 and 10. The blocks 9 and 10 are more efficient than the conventional Z-bar.

What is claimed is:

1. A blank guide device for a seam welding machine for producing can bodies, said device comprising:

a body having an upper groove opening out of one side thereof and a lower groove opening out of the other side thereof for guiding respective edges of a cylindrically-rolled blank to a welding point between opposed welding means for welding the edges to produce a cylindrical can body;

upper and lower vertically spaced projecting portions projecting from a forward end of said body and having block receiving recesses therein each having at least a portion thereof opening toward the corresponding block receiving recess in the other projecting portion; and a pair of blocks removably mounted in said block receiving recesses each having a surface thereon in spaced opposed relation to the corresponding surface on the other block and said surfaces having opposed L-shaped cross-sectional recesses therein with long sides thereof opposed to the other block and short sides thereof extending toward each other and facing in opposite lateral directions, said L-shaped recesses extending along the entire length of said blocks and forming continuations of corresponding surfaces of the grooves in said body and forming forward end portions of said grooves.

* * * * *